June 27, 1967  S. F. BUGYIE  3,328,047
STABILIZER BAR FOR TANDEM AXLE ARRANGEMENT
Filed Nov. 8, 1965  2 Sheets-Sheet 1
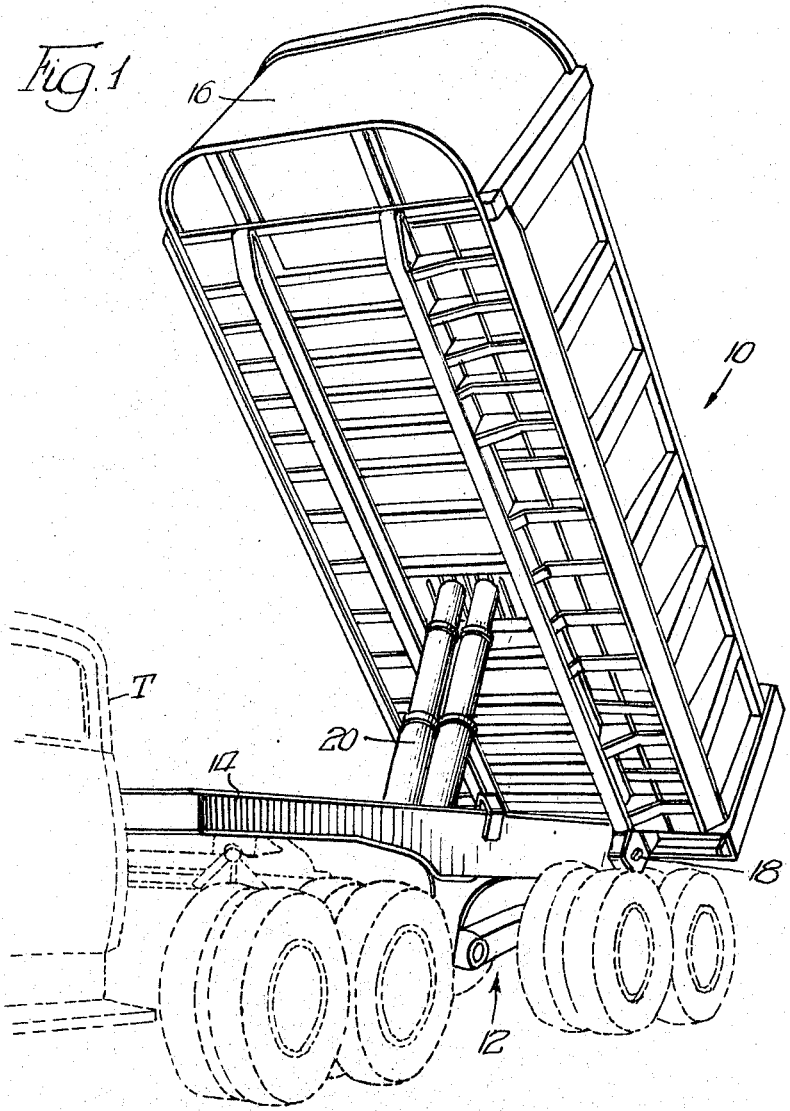
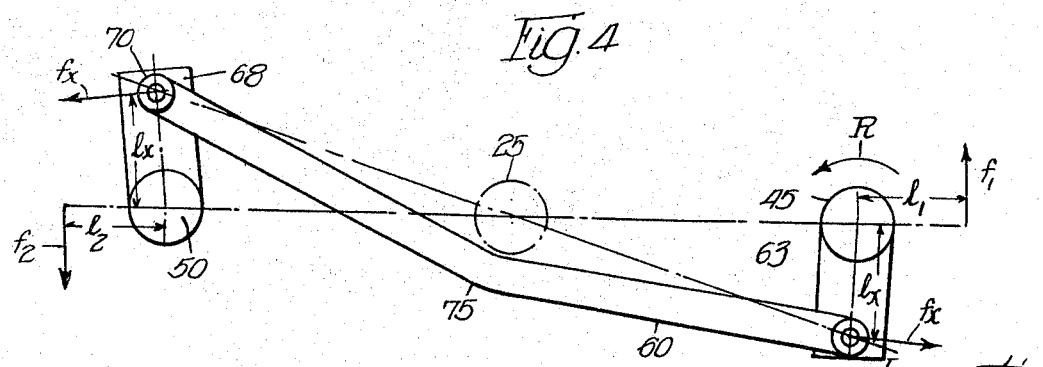
Inventor:
Steve F. Bugyie,
By Mann, Brown & McWilliams
attys June 27, 1967  S. F. BUGYIE  3,328,047
STABILIZER BAR FOR TANDEM AXLE ARRANGEMENT
Filed Nov. 8, 1965  2 Sheets-Sheet 2
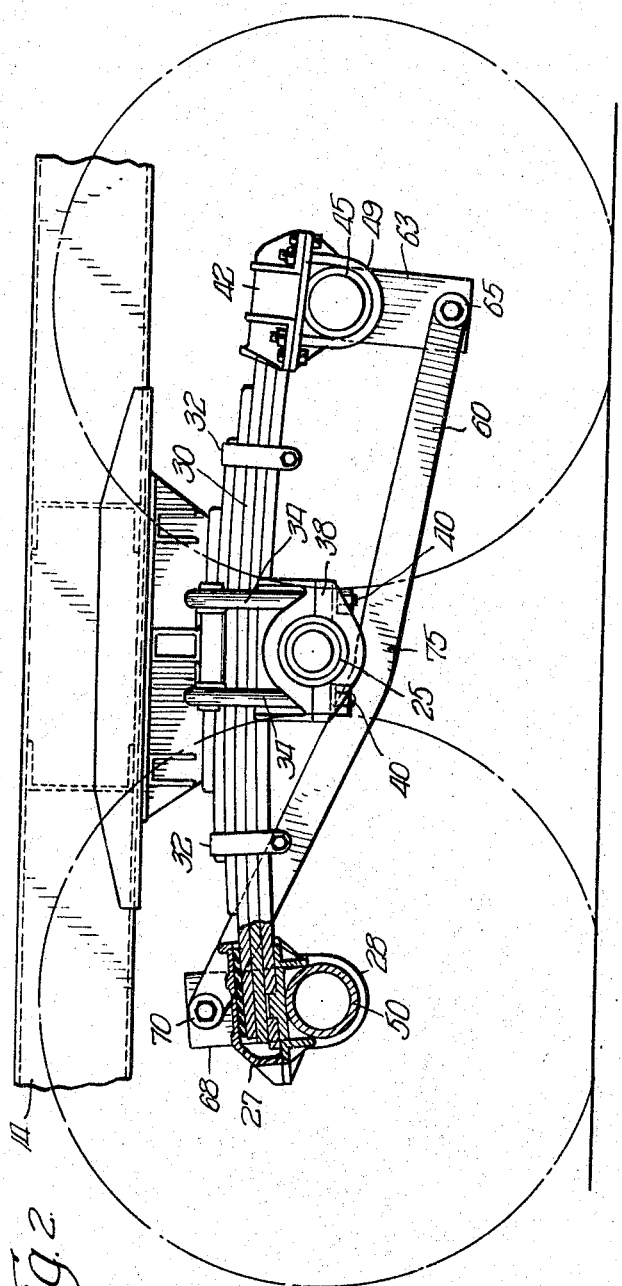
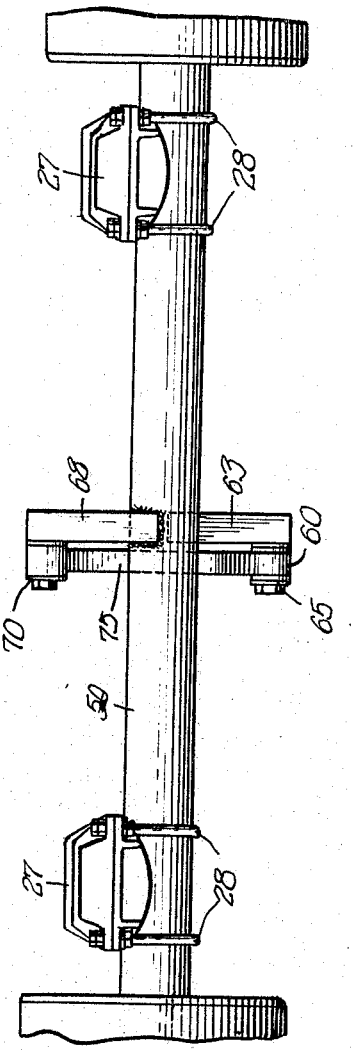
Inventor
Steve F. Bugyie.
By Mann, Brown & McWilliams,
Attys

United States Patent Office 3,328,047
Patented June 27, 1967

3,328,047
STABILIZER BAR FOR TANDEM AXLE ARRANGEMENT
Steve F. Bugyie, 10048 S. Sawyer Ave., Evergreen Park, Ill. 60642
Filed Nov. 8, 1965, Ser. No. 506,761
5 Claims. (Cl. 280—104.5)

The present invention relates to stabilizers for tandem axles, and more particularly to apparatus for neutralizing the tendency of a single point axle suspension used on heavy trailers and the like towards brake hop.

It is well known that when the brakes are applied to the wheels of a moving vehicle, and particularly a heavy vehicle, the braking action, which, in effect, engages the axle with the rotating brake drum, generates forces on the axle which are in a direction tending to rotate or "wind up" the axle in the same way as the wheel itself is rotating. Because the tandem axles are grounded to the frame in some manner, the tendency is to urge the axle to rotate about the connection with the frame of the vehicle.

Numerous intricate suspension systems have been devised for eliminating or otherwise neutralizing so called "brake hop" which is the natural result of the application of the brakes to the wheels of a tandem axle, and is pronounced under light loads. Brake hop is a visible phenomenon wherein the wheels actually tend to hop up and down when the brakes are applied.

It has been found that the tendency toward brake hop on the tandem axles of large dump trailers, for example, is pronounced. Because of the intricate balance required for such trailers, it is necessary that the suspension for the tandem axle be extremely hard.

It is an objective of the present invention to provide an extremely simplified torque limiting stabilizer arrangement for a single point suspension for completely neutralizing forces causing brake hop in tandem axles of this type, and thereby increase the useful life of the suspension assembly.

The foregoing and other objects and advantages of the present invention will appear from the following detailed disclosure of the invention, taken in conjunction with the drawings wherein:

FIGURE 1 is a perspective of a dump trailer having the type of tandem suspension to which the present invention is applicable;

FIGURE 2 is a section, in side elevation, to the tandem axle and associated suspension of FIGURE 1;

FIGURE 3 is a plan of the tandem suspension, showing the relationship of the stabilizer arrangement to the rest of the suspension; and FIGURE 4 is a schematic showing of the stabilizer bar as applied to the suspension.

While the invention is susceptible of various modifications and alternative constructions, a particular illustrative embodiment is shown in the drawings and will be described below in considerable detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

I have indicated that the present invention is particularly advantageous for use with single point suspensions such as the type found satisfactory for heavy dump trailers, and accordingly, the invention will be described in detail using such a suspension as exemplary. It will be understood and appreciated, however, that application of the principles herein disclosed will not be limited to such suspension, and may find application in other suspensions without departure from the invention.

With reference now to FIGURE 1, a dump trailer, indicated generally at 10, is shown, and embodies a single point suspension of a tandem type, indicated generally at 12. The trailer comprises a frame or bed 14 to which is mounted the box 16 which is pivoted at 18 to the rear of the frame or bed 14. Telescoping fluid actuators 20, which may be controlled from the tractor T or at any other convenient location, hoist the box 16 about its pivots to dump the contents thereof through a rear gate portion (not shown).

The trailer 10 is, for purposes of the present description, disposed on a tandem involving a single point suspension. A known suspension, of this type is manufactured by Neway Equipment Company of Muskegon, Mich., and, referring to FIGURE 2, centers about a trunnion tube 25 which is secured in suitable supports 27 by U clamps 28 depending from the frame or bed 14, towards the rear thereof. The trunnion tube runs transverse to the longitudinal axis of the trailer bed, and near each end thereof, supports a leaf spring axle suspension unit 30. Each leaf spring comprises a series of, in this case, heavy steel leaves which are suitably tied together by means of U-bolts 32. Each suspension unit is centrally mounted, in this case above the trunnion, and is tied thereto by means of spring U-bolts 34 which engage a saddle clamp 36 above the springs, and pass through a trunnion clamp 38 where they are tied by means of nuts 40, thereby securely clamping the suspension to the trunnion tube.

As seen, the spring units extend transverse to the axis of the tube, an equal amount on either side, where they mount, by means of spring end caps 42 to an axle 45, upon which a pair of vehicle wheels 47 are secured for rotation. The spring end caps are shock mounted about the ends of the leaf spring units 30 and the axles are tied thereto by means of suitable U-bolts 49, in a known manner.

As will be seen in FIGURE 3, one leaf spring suspension unit is disposed on either side of the trunnion tube, and each is tied to an axle, fore and aft of the trunnion tube. Presuming the front of the trailer to be in the direction of the arrow A, the axle 45 will be the aft axle of the tandem set and an axle 50 will be the fore axle.

With reference to FIGURE 4, which is a schematic representation of the structural arrangement of the torque limiting mechanism shown in FIGURE 2, it will be presumed that, at the time of application of the brakes, the vehicle is moving in a forward direction with a wheel rotation direction R, and that application of the brakes through the fore and aft axles is of equal magnitude. Application of the brakes will result in a frictional force between the brake drum and brake shoes tending to rotate the axle in the same direction as the wheels are rotating.

Again referring to FIGURE 4, the force $f_1$ acts upon an aft axle 45 at a distance $l_1$ from the center of the axle. The torque $f_1 l_1$ on the axle is in the counterclockwise direction. Likewise, the fore axle 50 is subjected to a force $f_2$ resulting from the application of the brakes to the wheels carried by that axle. The force $f_2$ acts as an effective radius of $l_2$ from the center of the axle and tends to apply a torque $f_2 l_2$ to the axle in the counterclockwise direction as seen in FIGURE 4. Because of the restraint of the leaf springs which are attached to the axles, the axles themselves cannot rotate. Because of the torque applied to them, however, they undergo the phenomenon of "brake hop" which results in a visible jumping of the wheels from the pavement as the vehicle is brought to a halt.

In keeping with the present invention, a stabilizer tube 60 is provided between the fore and aft axles of the tandem suspension, for the purpose of absorbing and neutralizing brake torque forces tending to cause undesirable brake hop as hereinbefore described.

The stabilizer tube or bar 60 is attached to the aft axle 45 by means of a depending lug 63 which may be welded or otherwise rigidly fastened to the axle 45, and which depends therefrom on a substantially vertical axis. The bar may be tubular or solid, and may be 4" in diameter, or any other convenient size. An aperture 65 is provided passing through the lug 63, and the aperture is preferably in a vertical plane passing through the center of the axle.

In a like manner, a lug 68 is rigidly attached to the fore axle 50, and is provided with an aperture 70, which is preferably in a vertical plane with the center of the axle 50. The aperture 70 is disposed above the axle, however, whereas the aperture 65 is below the axle. The distance from the center of the axle to the aperture on both lugs, is preferably the same so that the torque applied to the stabilizer bar 60, from each axle, will be identical. The stabilizing bar itself is disposed midway between the spring suspension unit 30 (see FIG. 3) and mounts to the lugs by means of any suitable bushing arrangement which permits limited rotation of the bar with respect to the lug.

Again referring to the diagram of FIGURE 4, it will be seen that the stabilizer bar 60 is attached to the fore axle at a radial distance $l_x$ therefrom. In a like manner, the stabilizer bar 60 is attached to the aft axle 50 at a radial distance $l_x$ therefrom. The magnitude of the distance $l_x$ is a matter of convenience and design, and any suitable distance will suffice. It is required that the stabilizer bar 60 be attached at an equal radial distance with respect to both the fore and aft axles as shown.

As a consequence of the positioning of the bar, a torque will be applied to the bar when the brakes are applied to the vehicle. The magnitude of the torque will be in proportion to the relative distances through which the brake applying force $f_1$ and $f_2$ are applied and the distance $l_x$. It should be pointed out that in the usual case the diameter of the brake drums on both the fore and aft axles will be the same, and therefore the distances $l_1$ and $l_2$ will be the same. In any event, braking torque will be applied to the stabilizer bar as indicated, and by virtue of the relative location of the ends of the stabilizer bar with respect to the axles 45 and 50, it will be seen that the torque $f_x l_x$, is applied to either end of the bar 60, but in opposite directions. As a result, there will be a net zero torque acting on the axles 45 and 50 and brake hop is eliminated.

While the arrangement as shown causes compressive forces to be applied to the bar 60, it will be appreciated that, by rearranging the position of the lugs on the respective fore and aft axles, a like result can be obtained, although the bar will be placed in tension. This arrangement may be accomplished without departure from the invention.

Further, in keeping with the invention, in order to avoid contact with the trunnion tube 25, the bar 60 is bent slightly as at 75, and therefore curves around the trunnion tube, avoiding contact therewith.

The stabilizer arrangement of the present arrangement is particularly meritorious because of its simplicity coupled with the very high degree of effectiveness which it has in eliminating the undesirable brake hop characteristic of such tandem suspensions. It will be understood that the invention is applicable to frameless vehicles as well as the one described.

I claim as my invention:

1. For use with a vehicle having a single point tandem axle or the like wherein a trunnion tube mounted transverse to the frame of said vehicle supports a pair of sets of leaf springs spaced from one another on the trunnion tube, the sets of leaf springs together supporting front and rear tandem axles parallel with said trunnion tube on either side thereof, means for neutralizing forces on said tandem axles resulting from the application of brakes, comprising lugs rigidly connected to each of the axles of said tandem set, each of said lugs having an aperture formed therein, the aperture in one said lug being above the axle to which said lug is attached and the aperture in the other lug being below the axle to which it is attached, a rigid bar extending between said lugs, and mounted in said apertures, said bar adapted to absorb forces on said axles resulting from the application of brakes to the wheels attached thereto.

2. The arrangement of claim 1 wherein said lugs are disposed equidistant between the sets of springs supporting the axles of the suspension.

3. The arrangement of claim 1 wherein the aperture in said lug mounted to the rear axle is disposed above said axle, and the aperture in said lug disposed on the front axle is located beneath said axle.

4. The arrangement of claim 1 wherein the aperture in the lug on the rear axle is located beneath said axle, and the aperture in said lug mounted to the front axle is disposed above said axle.

5. The arrangement of claim 1 wherein said bar is mounted at its ends in said apertures in said lugs, for limited pivotal movement with respect thereto.

References Cited

UNITED STATES PATENTS 1,779,393 10/1930 Evans _____ 280—104.5
1,877,052 9/1932 Reid _____ 280—104.5

BENJAMIN HERSH, *Primary Examiner.*

P. GOODMAN, *Assistant Examiner.*